United States Patent [19]

Gallagher et al.

[11] 3,927,053

[45] Dec. 16, 1975

[54] MONOMERCURY ORGANO CATALYST

[75] Inventors: James A. Gallagher, Grosse Ile; Bernardas Brizgys, Southgate, both of Mich.

[73] Assignee: BASF Wyandotte Corporation, Wyandotte, Mich.

[22] Filed: Mar. 4, 1974

[21] Appl. No.: 447,884

[52] U.S. Cl. ....... 260/433; 252/431 C; 260/77.5 AB
[51] Int. Cl.² .......................................... C07F 3/12
[58] Field of Search .......... 260/433, 431, 434, 252; 252/431 C

[56] References Cited
UNITED STATES PATENTS

| | | | |
|---|---|---|---|
| 2,137,236 | 11/1938 | Christiansen | 260/433 |
| 2,240,025 | 4/1941 | Worne et al. | 260/433 |
| 2,376,291 | 5/1945 | Sowa | 260/433 X |
| 2,637,677 | 5/1953 | Dinerstein | 260/434 X |
| 3,035,091 | 5/1962 | Wygant | 260/431 |
| 3,133,944 | 5/1964 | Christiansen | 260/434 |
| 3,414,599 | 12/1968 | Allen | 260/433 X |
| 3,419,509 | 12/1968 | Willett | 260/18 |
| 3,579,553 | 5/1971 | Leebrick | 260/433 |
| 3,583,945 | 6/1971 | Robins | 260/77.5 AB |
| 3,592,787 | 7/1971 | Robins | 260/77.5 AB |

FOREIGN PATENTS OR APPLICATIONS

| | | |
|---|---|---|
| 1,259,756 | 1/1972 | United Kingdom |
| 1,263,953 | 2/1972 | United Kingdom |

OTHER PUBLICATIONS

Skukis, J. Amer. Chem. Soc., Vol. 66, pp. 1462–1464 (1944).
Chemical Abstracts, Vol. 49, 3865h (1955).

*Primary Examiner*—Helen M. S. Sneed
*Attorney, Agent, or Firm*—Bernhard R. Swick; Joseph D. Michaels; Robert E. Dunn

[57] ABSTRACT

The monomercury acetate adduct of 2,2-bis(4-hydroxyphenyl) propane, select homologs thereof and their low molecular weight propylene oxide analogs are disclosed as liquid catalysts for the preparation of polyurethanes wherein the catalyst has the capability of becoming part of the polyurethane polymer backbone structure. Also disclosed is a process for preparing the novel catalyst.

8 Claims, No Drawings

MONOMERCURY ORGANO CATALYST

BACKGROUND

1. Field of the Invention

This invention relates to novel urethane catalysts which are both liquid and are capable of becoming part of the polymer chain.

2. Description of the Prior Art

Various organometallic compounds including organomercury compounds have been proposed in the prior art as catalysts for polyurethane reactants. U.S. Pat. No. 3,419,509 discloses the use of polymercury compounds such as bis(phenylmercury) dodecenyl succinate and bis(phenylmercury) decenyl succinate. The same reference shows that mercuric acetate is inoperative as a catalyst for the polyurethane reaction. U.S. Pat. No. 3,583,945 discloses certain monomercury organo compounds are also suitable as catalysts for the polyurethane reaction. Among the catalysts disclosed by this reference is phenyl mercuric acetate. A companion patent, U.S. Pat. No. 3,592,787, discloses other monomercury organo compounds wherein both of the mercury valences are bonded to oxygen atoms of carboxyl groups such as mercuric octoate, mercuric stearate, mercuric oleate, and mercuric naphthenate. British Pat. No. 1,263,953 discloses that monophenyl mercury esters of a maleic acid half-ester are also useful as polyurethane catalysts. Finally, British Pat. No. 1,259,756 discloses other organomercury compounds which may be used as catalysts in polyurethane reaction. All of the foregoing catalysts are solid compounds requiring solvating prior to use as a urethane reaction catalyst. It is often difficult to find a suitable solvent for the catalyst which is also compatible with the polyurethane elastomeric product sought. Additionally, in view of the potential hazard of organomercury compounds for ecological and health reasons, it is not entirely desirable to have mercury compounds remain in polyurethane formulations in such a condition that the mercuric compound can be thereafter removed.

SUMMARY OF THE INVENTION

In accordance with this invention there is provided a liquid monomercury organo catalyst for polyurethanes of the formula wherein:

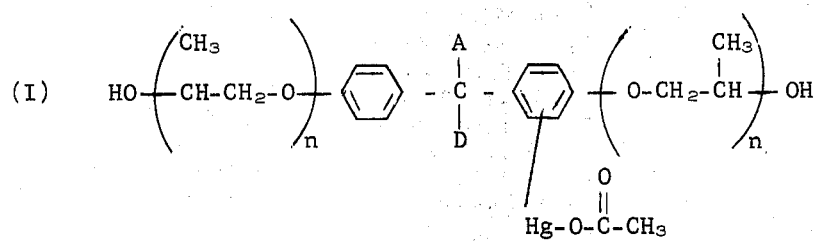

A is hydrogen or methyl;
D is hydrogen, methyl, ethyl or propyl; and
$n$ is a number from 0 to 6;

provided that the sum of carbon atoms present in A and D is 2 or 3, otherwise both A and D are hydrogen.

These novel catalysts are prepared by the reaction of 2,2-bis(4-hydroxyphenyl) propane, select homologs thereof or their propylene oxide analogs with mercuric acetate in the presence of a poly(1,2-propylene ether) glycol.

DESCRIPTION OF THE PREFERRED EMBODIMENT

The novel catalysts of this invention of Formula I above are prepared by the reaction of 2,2-bis(4-hydroxyphenyl) propane, commonly known as Bisphenol A, or bis(4-hydroxyphenyl) methane, commonly known as Bisphenol F, or 1,1-bis(4-hydroxyphenyl) butane or 2,2-bis(4-hydroxyphenyl) butane, commonly known as Bisphenol B, and their propylene oxide analogs of the formula

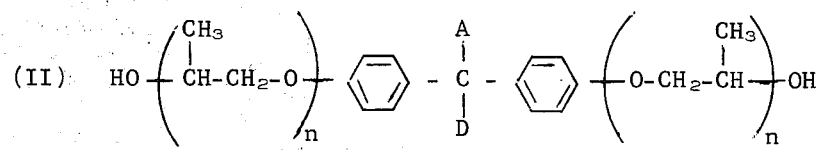

wherein A, D and $n$ have the same meaning as defined for Formula I above the mercuric acetate in substantially equal molar amounts in the presence of poly(1,2-propylene ether) glycol. For convenience the foregoing four enumerated bisphenol compounds will hereinafter be collectively referred to as "selected bisphenols". Where possible, for convenience the individual compounds will be referred to by their respective Bisphenol designation rather than their more formal and longer chemical name. When one of the selected bisphenols is the compound of Formula II above, then $n$ is 0 and the formula can be rewritten without the parenthetical expressions.

The selected bisphenols are well known in the art and can be prepared by various processes, for instance, that disclosed by U.S. Pat. No. 2,468,982 granted May 3, 1949. The use of the selected bisphenols in epoxy resins is discussed in three consecutive articles appearing in the *Journal of Applied Polymer Chemistry*, Volume 7, beginning at page 2135 (1963).

The propoxylated Bisphenol A products are commercially available and have molecular weights ranging up to about 900. These propoxylated products and also similar propoxylated products of the other selected bisphenols are prepared by the reaction of propylene oxide with the hydroxyl groups of the bisphenol in the presence of an alkaline catalyst such as alkali metal hydroxides, e.g., sodium hydroxide and potassium hydroxide, used at the rate of from about 0.05 to 0.2 weight percent of the total reactants charged. The technique is well known in the art and further discussion need not be employed regarding these starting products. However, for convenience reference is made to the textbook *Polyurethane: Chemistry and Technology*, Part I—Chemistry, J. H. Saunders and K. C. Frisch, Eds., Interscience Publishers, New York, N.Y. (1962) pages 32–42. The procedures, catalysts and conditions that are desirable for reacting propylene oxide with dihydric compositions are also disclosed in U.S. Pat. Nos. 2,677,700; 2,674,619; 3,036,118; 3,036,130; and 3,758,427. Analogous to the preparation of foregoing bisphenol resins are the epichlorohydrin resins disclosed in U.S. Pat. Nos. 2,602,075 and 3,305,528. For the sake of brevity, the foregoing patents and textbook references are herein incorporated by reference.

For convenience the selected bisphenols and their propylene oxide adducts of Formula II above will hereinafter be collectively referred to as bisphenol.

The monomercury acetate adduct catalyst of this invention is prepared by the reaction in equal molar amounts of mercuric acetate and a bisphenol as defined above. The reaction takes place in the presence of a propylene glycol which is either dipropylene glycol or a propoxylated adduct, namely, poly(1,2-propylene ether) glycol wherein the molecular weight can be as high as about 450. It has been found necessary to use a molar amount of the foregoing propylene glycol which is at least one-fifth of the molar amount of the bisphenol employed in preparing the novel catalyst of this invention. The reaction is carried out at a temperature from about 60° to 110°C. and preferably from about 70° to 100°C. and at reduced atmospheric pressure, preferably from about 1 to about 50 mm of mercury pressure, depending on which polyether glycol described above is employed, until no more acetic acid is evolved from the reaction. At this point the heat is removed and the novel catalyst is ready for use, it being neither necessary nor required to separate the monomercury adduct of the bisphenol from the propylene glycol which was used in the preparation of the catalyst. In keeping with standard commercial practice, it may be desirable to filter the product to insure that any of the solid unreacted reactants or other residue is removed and a more eye-appealing product is obtained. Parenthetically, it should be noted that both the propylene glycol used in the preparation of the catalyst and the catalyst prepared are capable of being fully reacted into and becoming a part of the polyurethane composition in which the catalyst is used in preparation thereof.

It was surprising to discover in preparation of the catalyst of this invention that no reaction is obtained and, therefore, no catalyst is obtained when Bisphenol A or other selected bisphenol is reacted directly with mercuric acetate. Additionally, no catalyst is obtained when the same bisphenol and mercuric acetate is reacted in the presence of hydroxyl-free ethylene oxide polyethers (i.e., those with terminal alkyl groups such as those sold under the trade name *Ansul Ethers*). Furthermore, no reaction is obtained when mercuric acetate is reacted with propylene glycol or poly(1,2-propylene ether) glycol. In fact, the mercuric acetate oxidizes propylene glycol to a propionic acid, readily identified by its foul ordor, and the reaction products contain a substantial quantity of free metallic mercury. Thus, it is quite surprising to find that the novel catalyst of this invention can be prepared by the reaction of mercuric acetate and a bisphenol in the presence of a critical amount of a dipropylene glycol or the propylene oxide adduct of the dipropylene glycol.

The novel catalysts of this invention are particularly desirable in the preparation of urethane compositions inasmuch as the catalyst is a liquid and, therefore, requires no solvating or other artificial techniques to prepare the catalyst for introduction into the urethane formulation, and since the catalyst is a liquid there is no fear of it stratifying or settling out at a later date. Additionally, as alluded to above, the catalyst having two hydroxyl groups, one on each end of the chain, can be reacted into and become a part of the polyurethane product without introducing any undesirable features to the urethane product prepared such as an undesirable amount of cross-linking, branching or other detrimental features. Additionally, the catalyst of this invention can be used in the place of chain extenders which are now employed to further lengthen the polyurethane chain and increase its molecular weight. Finally, because the novel catalyst of this invention is reacted into and becomes a part of the urethane formulation, the catalyst cannot be leached out at a later date subjecting the user or the site of the use to the possibility of mercury contamination such as would be possible with the use of a solid urethane catalyst which is not reacted into the urethane polymer.

The amount of catalyst used in preparation of the polyurethane products will vary according to the needs and dictates of the formulator in preparing the various urethane compositions. For instance, it has been found useful in preparing sealants for clay pipes and similar compositions wherein a long pot life is needed prior to the gelling of the composition, a suitable amount of catalyst is about 0.2 to 2.0 percent and more preferably from about 0.5 to 1.0 percent of the amount of the polyol used in the formulation of the urethane.

For the sake of uniformity, the catalysts are reduced to 10 percent metal and used at about 1.5 parts to about 3.0 parts by weight of catalyst based on the organic polyol employed.

It is to be understood that the mercury catalysts of this invention may be employed in the preparation of numerous polyurethane reaction products. Thus, polyurethane foams, elastomers, coatings and sealants may all be prepared according to this invention. The catalysts of this invention are particularly suited for use in the preparation of clay pipe and architectural sealants since these uses require a reaction mixture which has a gradual viscosity build-up, a rapid cure and a relatively short pot life, all features which are provided by use of the catalysts of this invention.

The polyurethanes prepared by the process of this invention basically comprise the reaction products of an isocyanate-containing material and an organic polyol. If it is desired to prepare a polyurethane foam, then, in addition to the above-mentioned materials, a blowing agent such as a halogen-substituted hydrocarbon and/or water is employed, as is generally a stabilizer such as an organic silicone compound. If it is desired to prepare a polyurethane sealant, then, in addition to the above-mentioned materials, a filler such as clay, calcium carbonate or silica is employed. It is to be understood that the particular reactants employed in the preparation of the polyurethane reaction products are well known in the art and vary according to the product desired.

Illustrative of the isocyanate-containing materials, which may be employed in accordance with this invention are organic polyisocyanates including aromatic, aliphatic and cyclo-aliphatic polyisocyanates and combinations thereof. Representative of these types are the diisocyanates such as m-phenylene diisocyanate, toluene-2,4-diisocyanate, hexamethylene-1,6-diisocyanate, tetramethylene-1,4-diisocyanate, cyclohexane-1,4-diisocyanate, naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4-diisocyanate; the trisocyanates such as 4,4', 4''-triphenyl methane diisocyanate, polymethylene polyphenylisocyanate, and toluene 2,4,6-triisocyanate and the tetraisocyanates such as 4,4'-dimethyldiphenyl methane 2,2',5,5'-tetraisocyanate. Especially useful due to their availability and properties are toluene diisocyanate, diphenylmethane-4,4'-diisocyanate and polymethylene polyphenylisocyanate.

Illustrative of the organic polyols which may be employed in accordance with this invention are those polyols containing at least two active hydrogen atoms. The term "active hydrogen atoms" refers to hydrogen atoms which, because of their position in the molecule, display activity according to the Zerewitinoff test as described by Kohler in *J. of Am. Chem. Soc.*, 49, 3181 (1927).

The active hydrogen atoms are usually attached to oxygen, nitrogen or sulphur atoms. Thus, suitable active hydrogen-containing groups as determined by the Zerewitinoff method which are reactive with an isocyanate group include —OH, —NH—, —COOH and —SH. Examples of suitable types of organic compounds containing at least two active hydrogen-containing groups which are reactive with an isocyanate group are hydroxyl-containing polyesters, polyalkylene polyether polyols, hydroxy-terminated polyurethane polymers, polyhydric, polythioethers, alkylene oxide adducts of acids of phosphorus, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the abovedefined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethylsuccinic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, alpha-methyl glucoside, pentaerythritol and sorbitol.

Any suitable polyalkylene polyether polyols may be used such as the polymerization product of an alkylene oxide or of an alkylene oxide with a polyhydric alcohol. Any suitable polyhydric alcohol may be used such as those disclosed above for use in the preparation of the hydroxylcontaining polyesters. Any suitable alkylene oxide may be used such as ethylene oxide, propylene oxide, butylene oxide and amylene oxide. The polyalkylene polyether polyols may be prepared from other starting materials such as tetrahydrofuran, epihalohydrins such as epichlorohydrin, as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which have found wide acceptance due to their excellent properties are the alkylene oxide addition products of trimethylolpropane, pentaerythritol, propylene glycol and sorbitol.

Any suitable polyhydric polythioether may be used such as, for example, the condensation product of thiodiglycol or the reaction product of a dihydric alcohol such as is disclosed above for the preparation of the hydroxylcontaining polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Alkylene oxide adducts of acids of phosphorus which may be used include those adducts prepared from the alkylene oxides disclosed above for use in the preparation of polyalkylene polyether polyols. Acids of phosphorus which may be used are acids having a $P_2O_5$ equivalency of from about 72 to about 95 percent. The phosphoric acids are preferred.

Any suitable polyacetal may be used such as, for example, the reaction product of formaldehyde or other suitable aldehyde with a dihydric alcohol such as those disclosed above for use in the preparation of the hydroxylcontaining polyesters.

Any suitable aliphatic thiol including alkane thiols containing at least two —SH groups may be used such as 1,2-ethane dithiol, 1,2-propane dithiol, 1,3-propane dithiol and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-secondary diamino naphthalene and 2,4-secondary diamino toluylene; aliphatic polyamines such as N,N'-secondary ethylene diamine, N,N'-secondary 1,3-propylene diamine, N,N'-secondary 1,4-butylene diamine and N,N'-secondary 1,3-butylene diamine.

Other compounds which do not necessarily fit within any of the previously set forth classes of compounds which are quite suitable in the production of NCO-terminated polyurethane compounds include the hydroxy-terminated polyurethane polymers such as a hydroxy-terminated polymer made by reacting an isocyanate with several moles of an alkylene glycol.

If desired, other catalysts may be employed in addition to the mercury catalysts of this invention. Any of the standard polyurethane catalysts such as amines and metal salts may be employed. Examples of such catalysts include N-methylmorphone, triethylamine, triethylene diamine, tetramethylene ethylene diamine, lead naphthenate, dibutyltin dilaurate, sodium stearate and zinc octoate.

The polyurethane reaction products may be prepared either by the prepolymer method, the "quasi" method, or by the "one-shot" method. These methods are well known in the art. The reaction conditions vary with the reactants employed and with the method followed. None of the conditions are important insofar as applicants' invention is concerned since applicants' invention resides in the finding that a certain group of mercury compounds imparts unique properties to polyurethane reaction products, however prepared.

The following examples are included to illustrate the preparation of the novel catalyst of the present invention and the use thereof but they are not to be considered limiting. Unless otherwise specified, all parts are parts by weight and all temperatures are expressed as degrees centigrade.

The general procedure for preparing the catalyst of this invention as utilized in the following Examples 1 through 8 plus the subsequent comparative examples was as follows:

A three-neck, 500-ml. flask fitted with a stirrer, vacuum take-off, trap chilled in dry ice, thermometer and nitrogen bleed was charged with the reactants indicated in the examples below. Some of the reactions were heated on a steam bath (pot temperature of about 95°C.) while later reactions were held to a pot temperature of about 80°C. with an electric heating mantle. The vacuum pump was started and, after the frothing (probably due to entrapped air) had ceased, the vacuum was adjusted to 20 mm. of mercury. When dipropylene glycol is used, the pressure should be higher, about 30 to 50 mm., because of the higher vapor pressure of this material. Periodically, the vacuum was released and the reaction flask weighed to determine the extent of the reaction, as measured by the loss of the acid. The loss in weight of the flask was nearly equivalent to the gain of weight in the trap. The entrapped material was 98 to 100 percent acetic acid. After a period of time, no more acid could be removed. Generally, discoloration of the reaction mixture, which varied from white to gray, usually occurred shortly before the point when no more acetic acid could be removed. The reaction was considered complete when no more acetic acid could be removed unless otherwise noted.

EXAMPLE 1

To the reaction flask was charged 45.2 grams of 2,2-bis(4-hydroxyphenyl) propane (0.2 moles) and 63.6 grams of mercuric acetate (0.2 moles) plus 99.0 grams of poly(1,2-propylene ether) glycol having a molecular weight of approximately 445 (0.2 moles). The reaction pot was maintained at a temperature of 80°C. at 20 mm. of mercury. There was a loss of 10 grams of acetic acid as a result of the reaction. The resulting catalytic solution was brown with a slight haze. The product after filtration contained 13.0 percent mercury (calculated 16.1 percent).

EXAMPLE 2

Following the general procedure to the reaction flask was charged 101 grams of dipropylene glycol, 45.2 grams of Bisphenol A and 63.6 grams of mercuric acetate. The reaction pot temperature was 100°C. After 5 hours the reaction was discontinued and the liquid catalytic product obtained was calculated to have a mercury content of 20.6 percent.

EXAMPLE 3

Following the general procedure 100 grams of dipropylene glycol, 45.2 grams of Bisphenol A and 63.6 grams of mercuric acetate was charged to the reaction flask. The reaction pot temperature was maintained at about 80°C. and there was a loss of 6 grams of acetic acid during the reaction. The liquid reaction product was again hazy and in an effort to reduce the haze the product was heated to 50°C. and some diatomaceous earth filter aid (Celite brand) was added. The mixture was then filtered and came through clear but soon, thereafter, a slight haze appeared in the product. After the second day, the product had as much haze as previously. The product was found to contain 16.3 percent mercury (calculated 19.2 percent).

EXAMPLE 4

Following the general procedure set forth above, to the reaction flask was charged 88.4 grams of a propylene oxide adduct of Bisphenol A having a molecular weight of about 550 and a hydroxyl number of 212, 17.6 grams of poly(1,2-propylene ether) glycol having a molecular weight of 445 and 63.6 grams of mercuric acetate. The reaction pot temperature was 91°C. and the reaction was maintained for 6 hours. The liquid reaction product obtained had a pronounced gray color. Because of the high viscosity of the product, 100 ml. of ethyl alcohol was added and the whole product filtered. A clear, yellow solution was obtained.

A portion of this solution was charged to a resin kettle and put on a steam bath and heated. The ethyl alcohol was recovered. The highly viscous catalyst solution became hazy after removal of the alcohol. The catalyst was found to contain 15.7 percent mercury (calculated 26.8 percent).

EXAMPLE 5

Following the general procedure set forth above when Bisphenol B is substituted for the bisphenol reactant of Example 4 a useful catalyst is obtained.

EXAMPLE 6

Following the general procedure set forth above, to the reaction flask was charged 32 grams of mercuric acetate, 53.2 grams of a mixture of propylene oxide adduct of Bisphenol A having a molecular weight of 550 and poly(1,2-propylene ether) glycol in a weight ratio of approximately 5:1 parts and 32 grams of poly(1,2-propylene ether) glycol. The reaction mixture was heated and maintained at 93°C. for a period of 6 hours. The resulting catalytic product remained cloudy.

EXAMPLE 7

Following the general procedure set forth above, to the reaction flask was charged a mixture of 106 grams of the propylene oxide adducts of Bisphenol A having molecular weight of 550 as previously described and poly(1,2-propylene ether) glycol in a weight ratio of 5:1 parts, respectively, 63.6 grams of mercuric acetate and 48.5 grams of dipropylene glycol. The reaction pot temperature was maintained at about 80°C. and reacted for a period of approximately 6 hours.

To the reaction flask was added diatomaceous earth as a filter aid and the product was filtered hot at 60°C. The recovered reaction product was calculated to have a mercury content of 17 percent by weight, found 13.3 percent.

EXAMPLE 8

A propylene oxide adduct of Bisphenol A having a molecular weight of 675 can be used in place of the propylene oxide adduct of Bisphenol A used in Example 7 to obtain a useful catalyst of this invention.

EXAMPLE 9

Following the general procedure set forth above when Bisphenol F is substituted for Bisphenol A as the selected bisphenol reactant of Example 1 a useful catalyst is obtained.

EXAMPLE 10

Following the general procedure set forth above, to the reaction vessel was charged 63.6 grams of mercuric acetate and 106.4 grams of a mixture of poly(1,2-propylene ether) glycol and 88.7 grams of a propylene oxide adduct of Bisphenol A having a molecular weight of 550 present in a ratio of 1:5 parts by weight. So as to show the influence or lack thereof of solvents in the reaction, 73 grams of toluene was also added. The reaction mixture was heated at 90°C. for 8 hours. A viscous hazy compound was obtained. The product was filtered through Whatman No. 1 filter paper and the filtrate with approximately 30 percent toluene was used as a catalyst in polyurethane formulations.

The utility of the foregoing catalyst compositions is shown hereby evaluating various catalysts as a catalyst for polyurethane compositions in a basic clay pipe sealant formulation. The formulation employed was 130 grams of a liquid propylene oxide adduct of glycerine having a basic functionality of 3 and an average molecular weight of 2920, 70 grams of a propylene oxide adduct of propylene glycol having a basic functionality of 2 and an average molecular weight of 2050 (both of the foregoing polyols being readily available commercial products) 39.2 grams of quasi-prepolymer based on commercially available mixed isomers (80:20 ratio) of toluene diisocyanate and poly(1,2-propylene ether) glycol having a molecular weight of 445 in a molar ratio of 4.5 moles of isocyanate per mole of polyol, there being 23.8 percent free isocyanate content in this reaction product.

Unless otherwise noted, the catalyst added was in the amount of 2.5 grams, this being calculated as a 10 percent mercury content, mercury content calculated on the monoacetic acid recovered as being directly related to the amount of mercury reacted. Each of the formulations was hand-mixed and the gel time for the formulation plus viscosity increase at given times was noted. For convenience the data is tabulated in Table I which follows:

Table I

| Catalyst | | Gel Time, min. | Maximum Temp., °C. | Viscosity (cps) at Time Indicated (minutes) | | | | |
|---|---|---|---|---|---|---|---|---|
| Example No. | Amount, grams | | | 2 | 10 | 20 | 25 | 30 |
| 1 | 2.5 | 21 | 51 | 550 | 675 | 1,450 | | |
| 2 | 2.5 | 21 | 48 | 200 | 210 | 300 | 425 | 950 |
| 3 | 2.5 | 18 | 50 | 500 | 375 | | | |
| 4 | 2.5 | 50 | 40 | 450 | 525 | 650 | 775 | 1,050 |
| 6 | 0.5 | 120 | | | | | | |
| 7 | 2.5 | 36 | 43 | 550 | 575 | 975 | 1,175 | 7,000 |
| 10 | 1.4 | 25 | | 500 | 600 | 4,150 | | |

COMPARATIVE EXAMPLES

EXAMPLE 11

Using the general procedure stated above, 45.2 grams of Bisphenol A was charged to the reaction flask, 63.6 grams of mercuric acetate and 217 grams (250 ml.) of toluene. No reaction was obtained. However, since the literature indicates that acetic acid and toluene are completely mutually soluble in each other thereby preventing the acetic acid from being given off, 103 grams of propylene glycol was added and the reaction again attempted but only toluene was removed by the vacuum distillation. The reaction was stopped and the contents dumped due to a foul odor resembling propionic acid and the appearance of metallic mercury being formed in the flask.

EXAMPLE 12

Following the general procedure as stated above, 45.2 grams of Bisphenol A, 63.6 grams of mercuric acetate and 101.6 grams of diethylene glycol dimethyl ether (available under the trade name ANSUL Ether 141) was charged to the reaction vessel. The mixture was heated to 48°C. and maintained at 50 ml. of pressure, inasmuch as the diethylene glycol dimethyl ether is reported to boil at 80°C. at the same pressure. At the end of the standardized reaction period it was apparent that there was no reaction as the mercuric acetate was obvious at the bottom of the flask.

EXAMPLE 13

Example 12 was repeated except the ether used in this example was triethylene glycol dimethyl ether available under the tradename ANSUL Ether 161. Because the boiling point of the ether used in this example is considerably higher, the temperature employed in carrying out the attempted reaction was 90°C. At the end of the reaction period the mercuric acetate and a small amount of metallic mercury had settled out of the reaction mixture and no acetic acid was collected as distillate or in the trap. It is evident then that no reaction had taken place.

EXAMPLE 14

In Example 11, 12 and 13 the mercuric acetate would not react with Bisphenol A in toluene, or the ethers tried. The analytical analysis of the reaction pot mixtures also indicated there was no aromatic ring substitution. However, it was shown in Example 1 when Bisphenol A, mercuric acetate and poly(1,2-propylene ether) glycol having a molecular weight of 445 are charged to the reaction pot, there is a reaction and a catalyst is prepared. So as to experimentally verify that the mercuric acetate is reacted and added to the aromatic ring of the catalyst mixture, the following reaction was carried out. Following the general procedure stated above, to a reaction flask was charged 89 grams of poly(1,2-propylene ether) glycol having a molecular weight of 445 and 63.6 grams of mercuric acetate. The reaction was carried out at 90°C. and a pressure of 20 mm. of mercury. At the end of the reaction period it was apparent that no reaction had taken place in the flask since the mercuric acetate was settling our of the mixture.

Thus, from Example 11 through 14 it can be concluded that there is a criticality in the procedure for the preparation of the liquid catalyst of this invention and that the elimination of any of the ingredients results in a failure to prepare the catalyst of this invention.

It is also apparent from an inspection of the results tabulated in Table I that the catalyst of this invention provides a large range of useful results depending upon the temperature and the concentration of the catalyst utilized in attaining the polyurethane cure. Furthermore, the rate of cure can also be influenced by the amount of propoxylation of the bisphenol nucleus.

The foregoing examples and methods had been described in the foregoing specification for the purpose of illustration and not limitation. Many other modifications and ramifications will naturally suggest themselves to those skilled in the art based on this disclosure. These modifications and ramifications are intended to be comprehended as within the scope of this invention.

The embodiments of the invention in which an exclusive property or privilege is claimed are defined as follows:

1. A liquid monomercury organo catalyst for polyurethanes having the formula

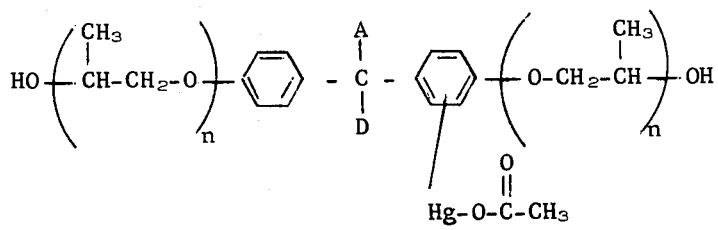

wherein:
A is hydrogen or methyl;
D is hydrogen, methyl, ethyl or propyl;
$n$ is a number from 0 to 6;
provided that the sum of carbon atoms present in A and D is 2 or 3, otherwise both A and D are hydrogen.

2. The catalyst of claim 1 wherein both A and D are methyl.
3. The catalyst of claim 2 wherein $n$ is 0.
4. The catalyst according to claim 2 wherein n is 3.
5. The process for preparing the catalyst of claim 1 comprises reacting at an elevated temperature mercuric acetate with a dihydroxy diphenyl compound of the formula

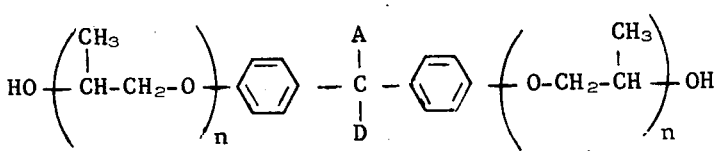

wherein:
A is a hydrogen or methyl;
D is hydrogen, methyl, ethyl or propyl;
$n$ is a number from 0 to 6;
provided that the sum of carbon atoms present in A and D is 2 or 3, otherwise both A and D are hydrogen in the presence of a polypropylene ether glycol having the formula

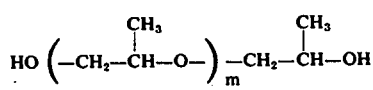

wherein $m$ is a number from 1 to 11.

6. The process of claim 5 wherein the polypropylene glycol is dipropylene glycol.
7. The process of claim 5 wherein the polypropylene glycol is described by the formula wherein $m$ is 5.
8. The process according to claim 5 wherein the temperature is from 70° to 100°C.

* * * * *